US010458591B2

(12) United States Patent
Kiest, Jr.

(10) Patent No.: US 10,458,591 B2
(45) Date of Patent: *Oct. 29, 2019

(54) DEVICE AND METHOD FOR REPAIRING PIPE

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 498 days.

This patent is subject to a terminal disclaimer.

(21) Appl. No.: 15/093,083

(22) Filed: Apr. 7, 2016

(65) Prior Publication Data

US 2016/0223122 A1 Aug. 4, 2016

Related U.S. Application Data

(63) Continuation of application No. 13/839,165, filed on Mar. 15, 2013, now Pat. No. 9,366,375, which is a continuation of application No. 13/161,581, filed on Jun. 16, 2011, now Pat. No. 8,667,991, which is a continuation of application No. 11/845,134, filed on Aug. 27, 2007, now Pat. No. 7,975,726.

(51) Int. Cl.
*F16L 55/16* (2006.01)
*F16L 55/18* (2006.01)
*F16L 55/165* (2006.01)
*F16L 55/179* (2006.01)

(52) U.S. Cl.
CPC .......... *F16L 55/18* (2013.01); *F16L 55/1651* (2013.01); *F16L 55/1656* (2013.01); *F16L 55/179* (2013.01)

(58) Field of Classification Search
CPC ... F16L 55/18; F16L 55/1651; F16L 55/1656; F16L 55/179; F16L 55/265
USPC .................. 138/97, 98; 405/150.1, 184.2
See application file for complete search history.

(56) References Cited

U.S. PATENT DOCUMENTS

| 2,465,515 A | 2/1947 | Conkling |
| 2,902,305 A | 9/1959 | Poltorak |
| 3,773,593 A | 11/1973 | Casadevall |
| 3,894,131 A | 7/1975 | Speech |

(Continued)

FOREIGN PATENT DOCUMENTS

| DE | 9313379.0 | 12/1993 |
| EP | 0506181 | 9/1992 |

(Continued)

OTHER PUBLICATIONS

Judgment of Case: 16-1636—*LMK Technologies, LLC v. BLD Services, LLC*—Filed: Feb. 13, 2017.

(Continued)

*Primary Examiner* — James F Hook
(74) *Attorney, Agent, or Firm* — Nyemaster Goode, P.C.

(57) ABSTRACT

A liner tube is provided for repairing either a single pipe line or a main pipe line having a lateral pipe line connected thereto. The liner tube assembly includes a liner tube impregnated with a liquid material capable of curing and hardening. The liner tube includes a gasket or band positioned about the juncture of the pipe lines. The gasket or bands form a tight seal between the liner tube and the pipe line.

32 Claims, 4 Drawing Sheets

(56) References Cited

U.S. PATENT DOCUMENTS

| | | | |
|---|---|---|---|
| 3,941,858 A | 3/1976 | Shepherd | |
| 4,072,219 A | 2/1978 | Hahm et al. | |
| 4,223,897 A | 9/1980 | Staab | |
| 4,752,511 A | 6/1988 | Driver | |
| 5,224,742 A * | 7/1993 | Ooka | F16L 55/10 138/98 |
| 5,297,582 A * | 3/1994 | Kitajima | F16L 55/10 138/97 |
| 5,324,139 A | 6/1994 | Wagner | |
| 5,340,160 A | 8/1994 | Meijers | |
| 5,393,481 A | 2/1995 | Wood | |
| 5,609,439 A * | 3/1997 | Schreiner | E03F 3/06 156/156 |
| 5,738,146 A | 4/1998 | Abe | |
| 5,752,786 A | 5/1998 | Huikari | |
| 5,765,597 A | 6/1998 | Kiest | |
| 5,794,663 A | 8/1998 | Kiest | |
| 5,927,341 A | 7/1999 | Taylor | |
| 5,950,682 A | 9/1999 | Kiest | |
| 5,971,031 A * | 10/1999 | Kamiyama | F16L 55/179 138/97 |
| 5,971,032 A | 10/1999 | Ward | |
| 6,021,815 A | 2/2000 | Kiest | |
| 6,039,079 A | 3/2000 | Kiest | |
| 6,068,725 A | 5/2000 | Tweedie | |
| 6,105,619 A | 8/2000 | Kiest | |
| 6,199,591 B1 | 3/2001 | Kiest | |
| 6,416,692 B1 | 7/2002 | Iwasaki-Higbee | |
| 6,541,106 B1 | 4/2003 | von Fay | |
| 6,641,687 B2 | 11/2003 | Kiest | |
| 6,641,688 B1 | 11/2003 | Gearhart | |
| 6,688,337 B2 | 2/2004 | Ward | |
| 6,994,118 B2 | 2/2006 | Kiest | |
| 7,121,305 B2 | 10/2006 | Kaneta et al. | |
| 7,311,121 B2 | 12/2007 | Kamiyama | |
| 7,481,246 B2 * | 1/2009 | Kamiyama | F16L 55/179 138/97 |
| 7,896,032 B2 | 3/2011 | Kiest | |
| 7,975,726 B2 | 7/2011 | Kiest | |
| 7,987,873 B2 | 8/2011 | Kiest | |
| 8,316,892 B2 | 11/2012 | Warren | |
| 8,667,991 B2 * | 3/2014 | Kiest, Jr. | F16L 55/1651 138/98 |
| 8,667,992 B2 * | 3/2014 | Kiest, Jr. | F16L 55/1651 138/98 |
| 9,366,375 B2 * | 6/2016 | Kiest, Jr. | F16L 55/1651 |
| 2003/0106601 A1 * | 6/2003 | Kweon | F16L 55/179 138/98 |
| 2003/0116211 A1 | 6/2003 | Ward | |
| 2004/0159359 A1 * | 8/2004 | Schmidt | F16L 55/16 138/98 |
| 2005/0121092 A1 | 6/2005 | Kiest | |
| 2006/0005893 A1 | 1/2006 | Kaneta | |
| 2006/0243337 A1 | 11/2006 | Manners | |
| 2008/0029177 A1 | 2/2008 | Kamiyama | |
| 2008/0245433 A1 | 10/2008 | Warren | |
| 2009/0056823 A1 | 3/2009 | Kiest | |
| 2011/0203719 A1 | 8/2011 | Kiest | |
| 2011/0259461 A1 | 10/2011 | Kiest | |
| 2011/0277864 A1 | 11/2011 | Kiest | |
| 2012/0261015 A1 * | 10/2012 | Warren | F16L 55/179 138/98 |
| 2013/0112303 A1 | 5/2013 | Kiest | |
| 2013/0249208 A1 * | 9/2013 | Kiest, Jr. | F16L 55/179 285/55 |
| 2014/0102576 A1 * | 4/2014 | Kiest, Jr. | F16L 55/1651 138/98 |
| 2014/0158243 A1 * | 6/2014 | Kiest, Jr. | F16L 55/265 138/97 |
| 2016/0273698 A1 * | 9/2016 | Kiest, Jr. | F16L 55/163 |

FOREIGN PATENT DOCUMENTS

| | | |
|---|---|---|
| EP | 0564741 | 10/1993 |
| EP | 1533560 | 5/2005 |
| WO | 2000004318 | 1/2000 |
| WO | 2001069121 | 9/2001 |

OTHER PUBLICATIONS

Fundich, Aaron E., et al. "A Case Study in Infiltration Reduction Through Trenchless Technology", http://www.lmktechnologies.com/images/pdfs/tliner-case-study-infiltration-reduction.pdf, 11 pages. Mar. 31, 1999.

Declaration of Christopher Adams, *BLD Services, LLC v. LMK Technologies*, 11 pages, May 16, 2014.

De Neff, Installation Instructions, SWELLSEAL WA, http://www.karaysa.com/products/pdf/waterstops-swellseal-wa.pdf, 3 pages, Apr. 30, 2006.

Kempenaers, P., "The Pressure resistance of SWELLSEAL Sealant WA", http://deneefusa.com/index.php/testing/doc_download/418-swellseal-wa-pressure-resistance, 3 pages Sep. 5, 2005.

De Neff, SWELLSEAL Hydrophilic Waterstop Solutions, http://www.deneef.com/USA/index2.php?option=com_docman&task=doc_view&grid=547&Itemid=35, 2002.

Petition for Inter Partes Review of U.S. Pat. No. 8,667,991 filed May 16, 2014, 65 pages.

Petition for Inter Partes Review of U.S. Pat. No. 8,667,992 filed May 16, 2014, 46 pages.

EP 16177727.1 Search Report dated Nov. 10, 2016.

Notice of Opposition to EP 3106731—dated Mar. 11, 2019.

* cited by examiner

DEVICE AND METHOD FOR REPAIRING PIPE

CROSS-REFERENCE TO RELATED APPLICATIONS

This application is a Continuation of U.S. Ser. No. 13/839,165 filed Mar. 15, 2013 which is a Continuation of U.S. Pat. No. 8,667,991 issued on Mar. 11, 2014 which is a Continuation of U.S. Pat. No. 7,975,726 issued on Jul. 12, 2011, all of which are herein incorporated by reference in its entirety.

BACKGROUND

The present invention relates to a device and method for repairing pipe, such as underground sewer pipe and the like.

Prior methods for repairing damaged pipe lines include moving a liner tube impregnated with a liquid material capable of curing and hardening to the position within the pipe where the damaged portion is located. The liner tube is urged in an outward radial direction into contact with the pipe line being repaired and the liquid material impregnating the liner tube is permitted to cure and harden. The liner tube forms an interior liner in the pipe for the pipe line being repaired.

On some occasions lateral pipe lines are connected to main pipe lines. Often damage occurs at the junction between the lateral pipe line and the main pipe line. T-shaped or Y-shaped liner tubes have been utilized to fit within the junction between the lateral pipe line and the main pipe line. Liner tubes form a T-shaped or Y-shaped liner after hardening to the interior of the junction between the lateral pipe line and the main pipe line.

Ground water outside the lateral pipe line and the main pipe line infiltrates through the damaged portion of the pipe line and migrates between the liner tube and the pipe line to a point where it can enter the pipe line. In order to prevent this infiltration of ground water, attempts have been made to adhere the liner tube to the interior surface of the pipe line being repaired, whether it is a single straight pipe line or a T-shaped or Y-shaped pipe line.

However, considerable difficulty has been encountered in attempting to obtain an adhesive bond between the liner tube and the interior of the pipe being repaired. The interior of the pipe being repaired is often greasy or oily even after high pressure water jetting is performed. Attempts have been made to wash the interior of the pipe line with some success, but washing the interior of the pipe line is often only partial and not reliable. Furthermore, in some types of pipes, such as polyethylene pipes, an adhesive bond cannot be maintained between the resin impregnated liner tube and the polyethylene pipe even if the pipe is free from grease and oils.

Even in those instances where the interior of the pipe line is suitable for accepting a liner, shrinkage of the liner can occur, which creates a gap that allows ground water to flow around the liner and eventually infiltrate the pipe line. For example, thermoset resins are used in cured-in-place pipe applications to form the liner to the interior of the pipe line. These thermoset resins tend to shrink during the curing process, thus creating a gap between the liner and the pipe. Even the slightest shrinkage in the liner can be problematic.

U.S. Pat. No. 6,994,118 addresses some of these problems in the art. The present invention constitute improvements and additions to the earlier disclosure.

A primary object of the present invention is the provision of an improved device and method for repairing pipe by using hydrophilic seals or other impermeable compressible materials.

A further object of the present invention is the provision of a device and method for preventing ground water from infiltrating a pipe line near the juncture between a main pipe line and a lateral pipe line.

A further object of the present invention is the provision of a device and method for repairing a section of a pipe and preventing entry of ground water from a damaged portion of the pipe being repaired.

A further object of the present invention is the provision of a device and method for repairing the juncture between a main pipe line and a lateral pipe line which uses a hydrophilic band or similar article of impermeable compressible material positioned between the main pipe line and the liner around the opening that connects the main pipe line to the lateral pipe line.

A further object of the present invention is the provision of a device and method for repairing the juncture between a main pipe line and a lateral pipe line which uses a hydrophilic gasket or gasket of similar impermeable compressible material that seals against entry of ground water at the juncture between the pipe lines.

A further object of the present invention is the provision of a device and method for repairing pipe using hydrophilic seals and the like which is economical to manufacture, durable in use, and reliable in operation.

SUMMARY

According to one feature of the present invention, an apparatus is provided for repairing the juncture between a main pipe line and a lateral pipe line. The apparatus includes a main liner member and a lateral liner tube made of resin absorbent material. A hydrophilic gasket or gasket of similar impermeable compressible material surrounds a portion of both the main liner member and the lateral liner tube and is positioned between the host pipes and the liner assembly in operation. The hydrophilic gasket is capable of swelling in response to being exposed to a liquid, such as water, and forms a seal between the liner assembly and the host pipes at the juncture between the host pipes. The apparatus can be used in applications where the lateral liner is inverted into the lateral pipe line or in so-called "pull-in-place" applications. In a pull-in-place application, both the main liner and lateral liner are moved through the main pipe line to a position where the lateral liner ultimately extends inside the lateral pipe line and the main liner is positioned in the main pipe line near the access opening to the lateral pipe line.

According to another feature of the present invention, a hydrophilic band or band made of a similar impermeable compressible material is positioned on the main liner portion of a main/lateral liner. The band surrounds the opening between the main and lateral liners and is disposed between the main pipe line and the liner around the periphery of the opening between the main and lateral pipes to effectively seal against entry of ground water at the pipe junction. Again, this apparatus is suitable for use in both inversion-style applications and pull-in-place applications.

According to yet another feature of the present invention, an apparatus and method for inverting a liner in a cured-in-place application is provided. The liner includes two hydrophilic bands connected to the interior lining surface of the liner that are spaced apart from one another a sufficient distance so as to create a seal between the host pipe and the liner on opposite sides of the damaged portion of the pipe. When the liner is inverted, the hydrophilic bands are positioned on the outside of the liner between the host pipe and the liner. Exposing the hydrophilic bands to water or other liquid causes them to swell, thereby creating the desired seal.

DETAILED DESCRIPTION

Figure 1:
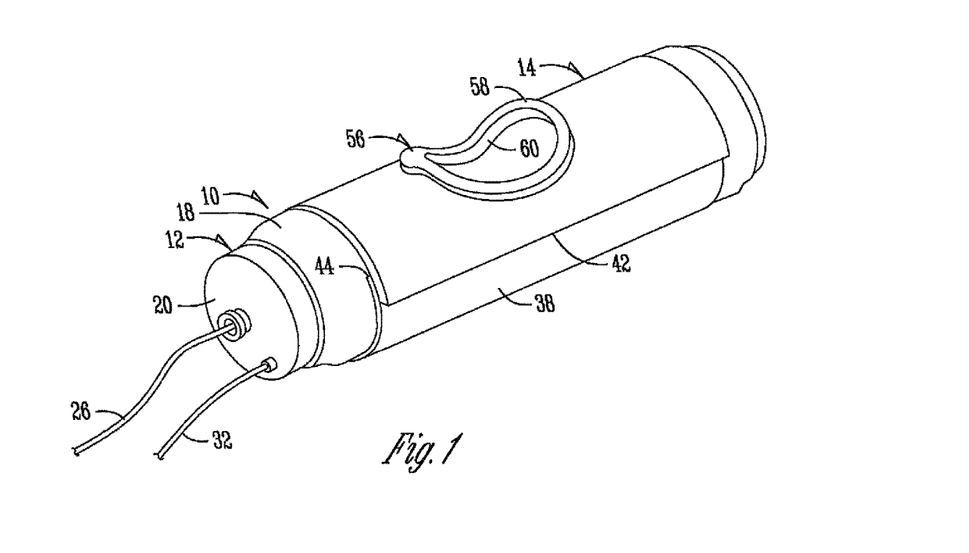
FIG. 1 is a perspective view of a repair assembly for repairing a lateral pipe line and a main pipe line.
Figure 2:
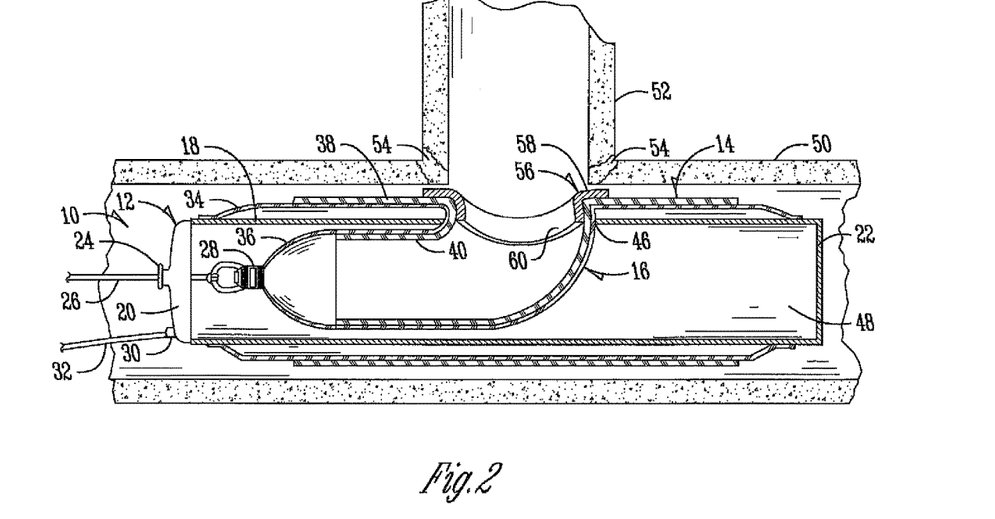
FIG. 2 is a sectional view of a main pipe line and a lateral pipe line showing one embodiment of the present invention.
Figure 3:
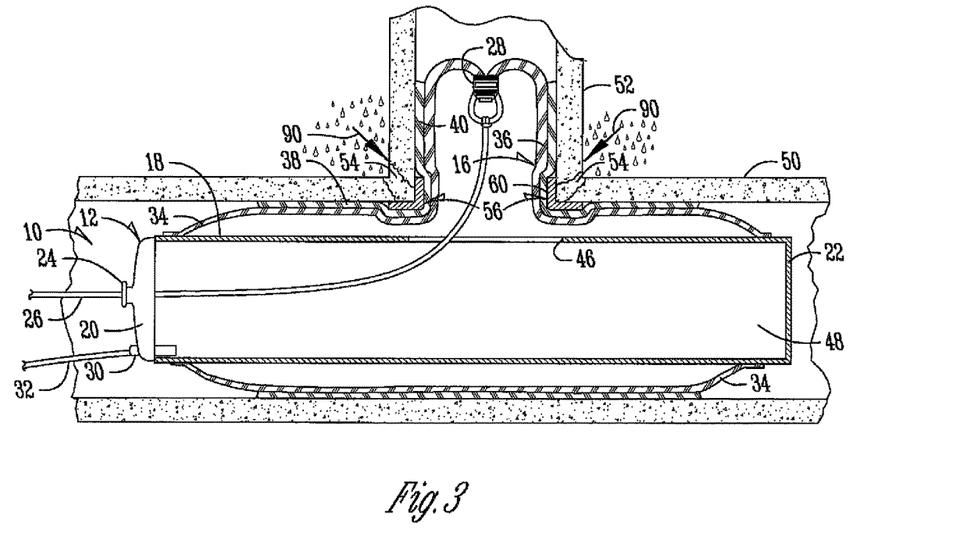
FIG. 3 is a view similar to FIG. 2, but showing the liner in its inflated position.

Referring to FIGS. 1-3, a repair assembly is generally designated by the numeral 10. Repair assembly 10 includes a launcher device 12 having mounted thereto a T-shaped or Y-shaped liner assembly 14. Repair assembly 10 also houses a T-shaped or Y-shaped bladder assembly 16. In the particular configuration shown in FIGS. 1-3, the liner assembly 14 and bladder assembly 16 are T-shaped, but they can also be Y-shaped to accommodate a lateral pipe line that intersects with a main pipe line at an oblique angle.

Launcher device 12 includes side walls 18, an end cap 20 and an end wall 22, all of which form a launcher device cavity 48. End cap 20 includes a line inlet 24 through which a line 26 extends. Line 26 is attached to a closed bladder tube end 28. Also extending through end cap 20 is an air inlet 30 which is connected to an air hose 32. T-shaped or Y-shaped bladder tube assembly 16 includes a main bladder tube 34 and a lateral bladder tube 36. Similarly, the T-shaped or Y-shaped liner assembly 14 includes a main liner tube 38 and a lateral liner tube 40. The bladder assembly 16 is fitted on the interior of the liner assembly 14.

As can be seen in FIG. 1, the main liner tube 38 is comprised of what is initially a flat sheet of material which is wrapped around the outside of the main bladder tube 34 and the launcher device 12. The main liner tube 38 includes overlapping edges 42, 44. The launcher device 12 includes a launcher device opening 46, and the lateral liner tube 40 is contained within the launcher device cavity 48 as shown in FIG. 2. Similarly, the lateral bladder tube 36 is contained within the cavity 14 and surrounds the lateral liner tube 40. Both the main liner tube 38 and the lateral liner tube 40 are comprised of a felt layer, which is the lining surface that contacts the interior surface of the host pipe, and a polymer coating is on the opposite surface.

FIGS. 2 and 3 show the repair assembly 10 within a main pipe line 50 which is connected to a lateral pipe line 52. The damaged portion 54 is shown needing repair. Ground water from outside the lateral pipe line 52 and the main pipe line 50 will seep through the damaged portion 54 and enter the interior of the main pipe line 50 and the lateral pipe line 52.

In order to prevent this seepage of ground water, a gasket 56 is positioned about a portion of the liner assembly 14. The gasket 56 includes a tubular portion 60 that extends at least partially within the lateral liner tube 40 and a flange portion 58 that extends outwardly about the periphery of one end of the tubular portion 60. The flange portion 58 of the gasket 56 is preferably attached to the main liner tube 38 around the juncture between the main liner tube 38 and the lateral liner tube 40 so as to maintain the gasket 56 in proper position as the repair assembly 10 is positioned for operation. The gasket 56 is preferably made of a hydrophilic material capable of swelling in response to being exposed to water or other liquid. However, other materials for the gasket 56 found suitable include neoprene rubber, other similar gasket materials such as urethane or silicone rubber, and like impermeable compressible materials.

FIG. 2 shows the repair assembly 10 moved within the main pipe line 50 adjacent the lateral pipe line 52. The launcher device opening 46 is registered with a junction between a lateral pipe line 52 and the main pipe line 50. This alignment is done with a TV camera (not shown). The lateral bladder tube 36 and the lateral liner tube 40 are contained within the launcher device cavity 48. It should be noted that the lateral liner tube 40 and tubular portion 60 of the gasket 56 extend within the lateral bladder tube 56 in FIG. 2; whereas, the main liner tube 38 and the flange portion 60 of the gasket 56 remain outside the main bladder tube 34 on the exterior of the launcher device 12.

Air pressure is introduced in the cavity 48 through air hose 32, urging the liner tube assembly 14 into contact with the interior walls of the main pipe line 50 and the lateral pipe line 52. Continued air pressure causes the lateral bladder tube 36 and the lateral liner tube 40 to invert outwardly through the launcher device opening into the lateral pipe line 52 from the position shown in FIG. 2 to the position shown in FIG. 3. While air is the preferred pressurized material, other gasses or fluids may be used. It should be noted that this inversion process causes the lateral liner tube 40 to be placed on the outside of the bladder tube 36 once the inversion is complete, as shown in FIG. 3. In this position, the gasket 56 is positioned between the main liner tube assembly 14 and the interior walls of the main pipe line 50 and between the lateral liner tube assembly 16 and the interior walls of the lateral pipe line 52. Pressure within cavity 48 is maintained until the liquid hardenable material, preferably a resin activated with a catalyst, cures and hardens. This results in the liner assembly 14 assuming a rigid configuration, forming a lining to the lateral pipe line 52 and the main pipe line 50.

The gasket 56 is preferably made of a material which is hydrophilic and which is capable of expanding in response to encountering ground water or other liquid. A manufacturer of such hydrophilic material is DeNeef Construction Chemical Co., 18314 Mathes Road, Waller, Tex. 77484, under the trademark SWELLSEAL™.

The ground water, as designated by the arrows 90 in FIG. 3, can seep towards the hydrophilic gasket 56. However, upon encountering the hydrophilic gasket, the water causes the gasket to expand in both a radial inward direction and a radial outward direction. This causes the gasket 56 to form a water tight seal between the T-shaped or Y-shaped liner assembly 14 and the interior walls of the main pipe line 50 and the lateral pipe line 52.

While the preferred embodiment of the invention is intended for use with an inversion-type application wherein the lateral bladder tube 36 and the lateral liner tube 40 invert outwardly into the lateral pipe line 52, those skilled in the art will appreciate that the gasket 56 can also be used in pull-in-place applications. In a pull-in-place application, the gasket can be threaded down the lateral liner tube 40 to the juncture between the main liner tube 38 and the lateral liner tube 40. In such a pull-in-place application, it is less important that the gasket 56 be attached to the liner assembly 14, as the gasket 56 will tend to stay in proper position as the lateral bladder tube 36 and lateral liner tube 40 are moved through the main pipe line 50 and ultimately into the lateral pipe line 52 while at the same time the main bladder tube 34 and main liner tube 38 are moved along the main pipe line 50 to a position adjacent the opening to the lateral pipe line 52.

Although the precise dimensions of the gasket are not necessarily critical to the present invention, a tubular portion having a length of approximately 6 inches and a flange portion 60 having a diameter of approximately 12 inches has been found suitable for most sewer pipe applications.

Figure 4:
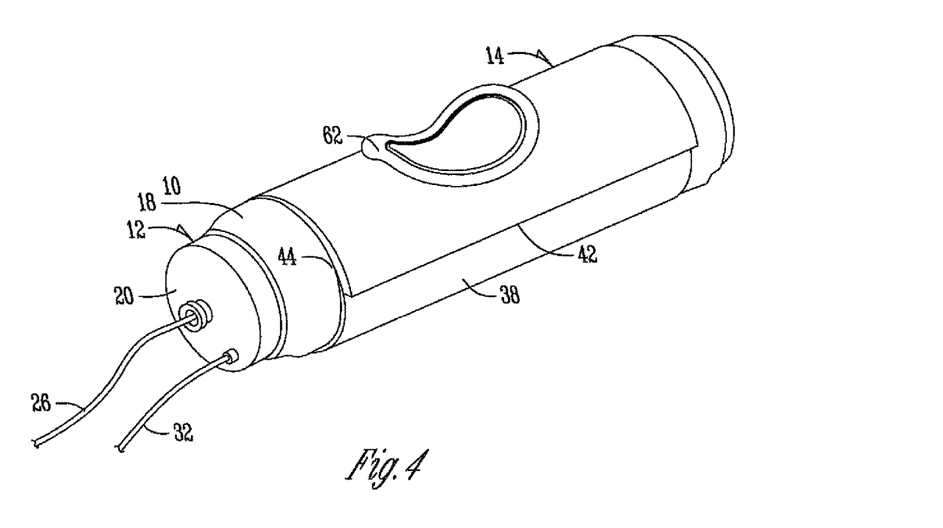
FIG. 4 is a perspective view of an alternative embodiment of a repair assembly for repairing a lateral pipe line and a main pipe line.
Figure 5:
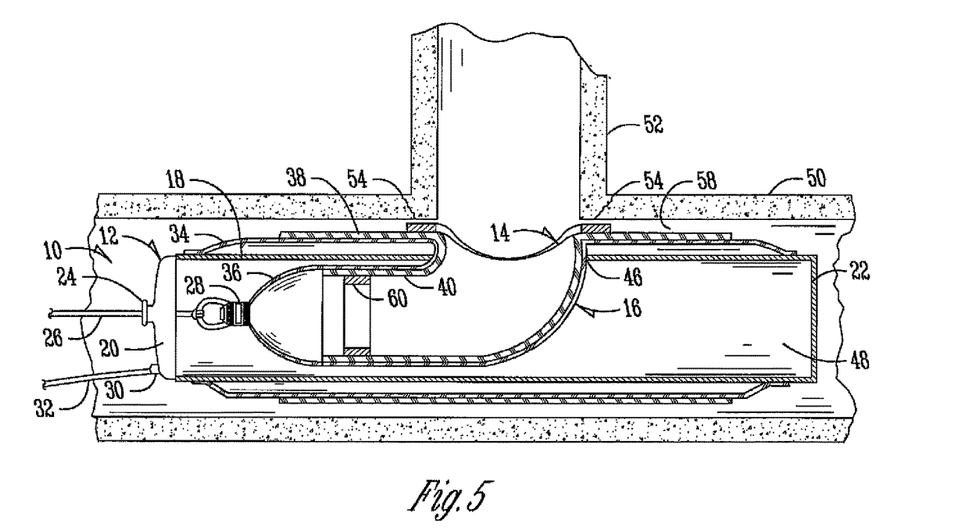
FIG. 5 is a sectional view of a main pipe line and a lateral pipe line showing the device in FIG. 4.
Figure 6:
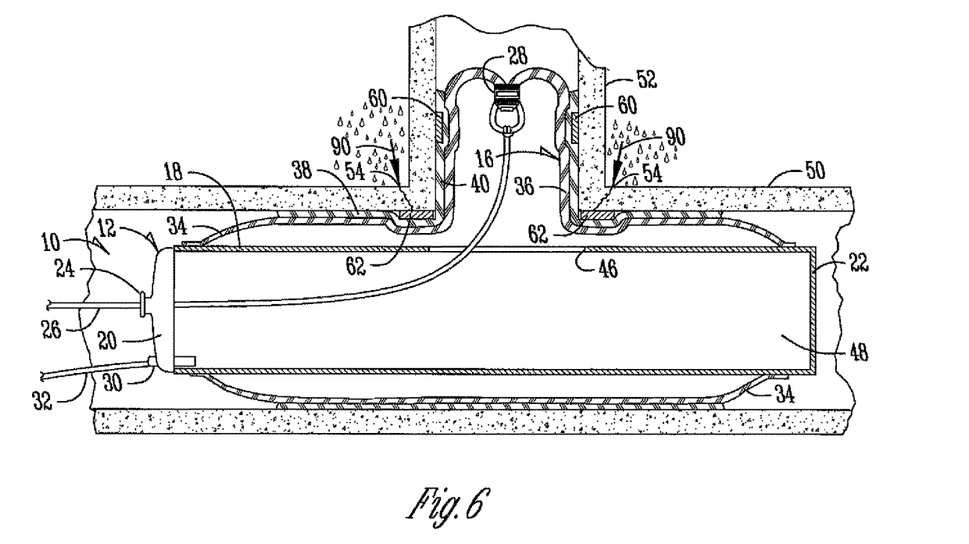
FIG. 6 is a view similar to FIG. 5, but showing the liner in its inflated position.

FIGS. 4, 5 and 6 illustrate an alternative embodiment of the present invention wherein the gasket 56 is replaced with a ring-shaped band 62 of hydrophilic material or like impermeable compressible material. The band 56 is positioned on the main liner tube 38 and extends around the juncture between the main liner tube 38 and the lateral liner tube 40. The band 62 is again preferably made of a hydrophilic material and swells in response to being exposed to water or other liquid. In specific, the band 62 expands outwardly and inwardly in a radial direction to effectively seal the area between the liner assembly and the juncture between the main pipe line 50 and lateral pipe line 52.

In applications where the lateral liner tube 40 is inverted into the lateral pipe line 52, it is preferred that the band 62 is attached to the main liner tube 38 to secure the band in place. The band can be attached by means of stitching, stapling, or by use of an adhesive or similar attachment means. The band 62 may be made from a hydrophilic material such as the one provided by DeNeef Construction Chemical Co. (described previously). A hydrophilic paste can also be used to form the ring or band 62 on the main liner tube 38. One such hydrophilic paste is distributed by OCM, Inc. in Vernon Hills, Ill. under the trademark ADEKA ULTRA SEAL, part number P-201. This product is a single component hydrophilic paste used in water stop repairs. The band 62 may also be made from a paste that is no hydrophilic yet forms an impermeable compressible gasket when cured. One such impermeable compressible paste is distributed by Manus Products, Inc. in Waconia, Minn.

Figure 7:
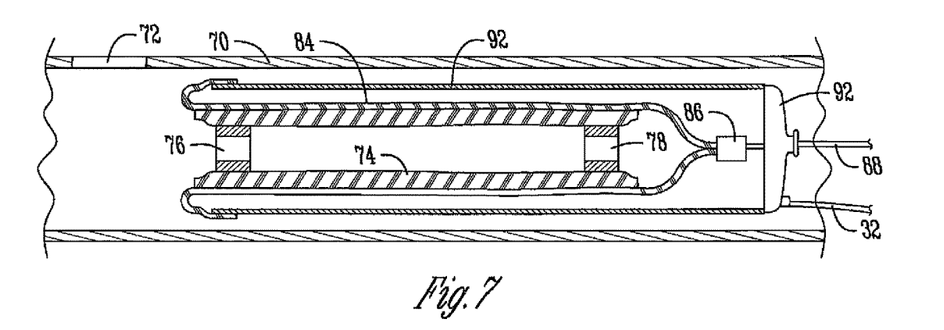
FIG. 7 is a sectional view of a pipe line, showing another embodiment of the present invention.
Figure 8:
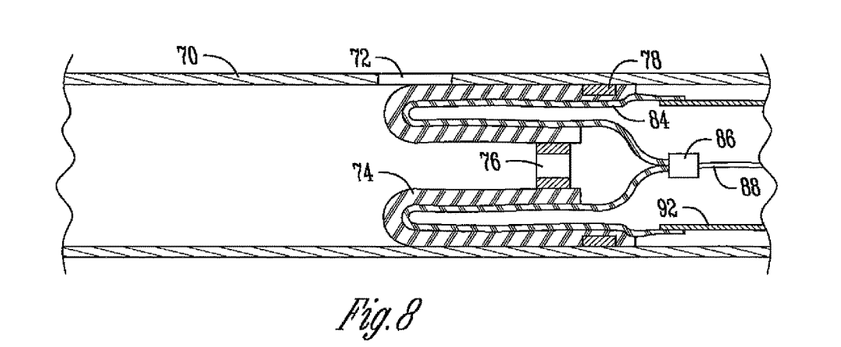
FIG. 8 is a sectional view similar to FIG. 7, showing the liner in a partially inverted position.
Figure 9:
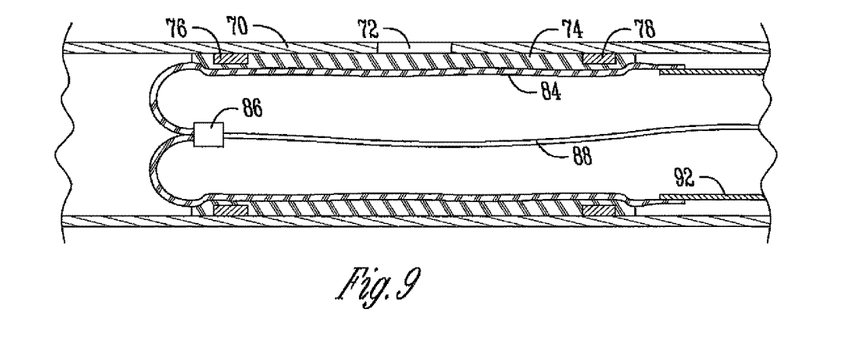
FIG. 9 is a sectional view similar to FIG. 8, showing the liner in a fully inverted position.

FIGS. 7, 8 and 9 illustrate another version of the present invention. Although U.S. Pat. No. 6,994,118 discloses the use of hydrophilic seals positioned between the host pipe and the liner tube on opposite sides of the damaged portion of a pipe line, simply moving the liner tube and bladder into position along the pipe line has well-known disadvantages not experienced by inversion techniques. The present invention also includes an embodiment wherein hydrophilic seals or bands can be positioned on opposite sides of a damaged portion of a pipe line through an inversion-style lining technique. FIG. 7 illustrates a singular pipe 70 having a damaged portion 72. A launcher device 92 houses a liner tube 74 and a bladder tube 84 and is positioned in the pipe 70. About the interior lining surface of the liner tube 74 is a first hydrophilic band or seal 76 and a second hydrophilic band or seal 78 spaced apart so as to be located on opposite sides of the damaged portion 72 of the pipe 70 when the bladder tube 84 and liner tube 74 are inverted. The first and second hydrophilic bands or seals 76, 78 are attached to the interior lining surface of the liner tube 74 by stitching, stapling, by use of an adhesive or other suitable attachment means.

FIG. 8 shows the liner tube 74 and the bladder tube 84 is a partially inverted position.

FIG. 9 shows the liner tube 74 and the bladder tube 84 fully inverted wherein the liner tube 74 is positioned at the damaged portion 72 and the first and second hydrophilic bands or seals 76, 78 are located on opposite sides of the damaged portion 72 of the pipe 70. In these instances where the lining begins a significant distance away from the launcher device, the bladder tube 84 acts as a positioning tube with the liner tube 74 positioned accordingly inside the bladder tube 84, so that the liner tube 74 does not invert until it reaches the damaged portion 72 of the pipe 70.

The liner tube 74 comprises a layer of felt-like material which is impregnated with a liquid material capable of curing and hardening and may have a polymer outside layer or coating. The bladder tube 84 is inside the liner tube 74 after inverting and includes a closed end 86 and a line 88 extending outwardly there from. Air or fluid is introduced into the interior of bladder tube 84 to urge the bladder tube 84 radially outwardly so as to urge the liner tube 74 into contact with the tube 70 being repaired.

The first and second hydrophilic bands or seals 76, 78, when encountered by ground water seeping through the damaged portion 72 will expand and form a water tight seal on opposite sides of the damaged portion 72. This prevents water from entering the interior of the pipe line 70.

Those skilled in the art having the benefit of this disclosure will appreciate that in some applications a single band or seal can be used to prevent ground water from entering the interior of the pipe line. For example, in lining a lateral pipe towards a main pipe, positioning a hydrophilic band at the downstream end of the liner prevents ground water from running down between the liner and pipe and emptying back into the pipe line.

The invention has been shown and described above with reference to the preferred embodiments, and it is understood that many modifications, substitutions, and additions may be made which are within the intended spirit and scope of the invention. The invention is only to be limited by the claims appended hereto.

What is claimed is:

1. An apparatus for repairing a main pipe line a lateral pipe line connected thereto and in communication therewith to form a pipe juncture, the apparatus comprising:
   a bladder assembly comprising a main bladder tube and a lateral bladder tube in communication with one another through a bladder tube juncture;
   a liner assembly comprising a main liner member and a lateral liner tube of resin absorbent material in communication with one another through a liner juncture;
   the lateral bladder tube and the lateral liner tube being adapted to extend within the lateral pipe line with the lateral bladder tube being inside the lateral liner tube and the lateral liner tube being between the lateral pipe line and the lateral bladder tube;
   the main bladder tube and the main liner member being adapted to extend within the main pipe line at the pipe juncture with the main liner member being between the main pipe line and the main bladder tube; and
   a gasket comprising a single band of an impermeable hydrophilic material disposed on the outside of the main liner member and surrounding the liner juncture, the band forming a seal between the liner assembly and main pipe line around the pipe juncture.

2. The apparatus of claim 1 wherein the main liner member is formed as a tube.

3. The apparatus of claim 1 wherein the single band of impermeable hydrophilic material is a hydrophilic paste.

4. The apparatus of claim 1 wherein the hydrophilic material capable of swelling in response to being exposed to a liquid.

5. The apparatus of claim 1 wherein the gasket has a tubular portion with a first end and a second end and a flange portion extending outwardly from one of the first and second ends of the tubular portion.

6. The apparatus of claim 5 wherein the flange portion of the gasket is positioned on the main liner member and surrounds the liner juncture formed between the main liner member and the lateral liner tube.

7. The apparatus of claim 1 further comprising a launcher device, the main bladder tube at least partially surrounding the launcher device.

8. The apparatus of claim 1 wherein the main bladder tube is configured to expand under fluid pressure to press the main liner member against the main pipe line and the gasket against the main pipe near the pipe junction.

9. The apparatus of claim 8 wherein the lateral bladder tube is configured to expand under fluid pressure to press the lateral liner tube against the lateral pipe line.

10. A method of repairing a main pipe line and a lateral pipe line connected thereto and in communication therewith to form a pipe juncture, the method comprising:
    taking a bladder assembly including a main bladder tube and a lateral bladder tube;
    taking a liner assembly including a main liner member and a lateral liner tube in communication with one another through a liner juncture;
    impregnating the liner assembly with a material capable of curing and hardening;
    positioning a gasket comprising a single band of impermeable, compressible, and hydrophilic material on the outside of the main liner member around the liner juncture;
    moving the lateral liner tube and the lateral bladder tube within the lateral pipe line with the lateral bladder tube being within the lateral liner tube; and
    exposing the single hydrophilic band to a liquid that causes the band to swell, thereby forming a seal between the liner assembly and the main and lateral pipe lines at the pipe juncture.

11. The method of claim 10 wherein the lateral liner tube and the lateral bladder tube are inverted through the single hydrophilic band into the lateral pipe line.

12. The method of claim 10 wherein the lateral liner tube and the lateral bladder tube are pulled into the lateral pipe line.

13. The method of claim 10 wherein the impermeable, compressible, and hydrophilic material is hydrophilic paste.

14. An apparatus for repairing a main pipe and a lateral pipe connected thereto and in communication therewith to form a pipe junction, comprising:
    a liner assembly comprising a main liner member and a lateral liner tube extending from the main liner member;
    the lateral liner tube extendable to a position within the lateral pipe; and
    a gasket attached to the main liner member and surrounding a liner juncture formed between the main liner member and the lateral liner tube, wherein the gasket is formed from an impermeable hydrophilic material;
    wherein the lateral liner is inverted through the gasket and against the lateral pipe.

15. The apparatus of claim 14 further comprising a bladder assembly comprising a main bladder tube and a lateral bladder tube extending from the main bladder tube, wherein the main liner member at least partially surrounds the main bladder tube and the lateral liner tube is positioned between the lateral pipe and the lateral bladder tube.

16. The apparatus of claim 15 wherein the main bladder tube is configured to expand under fluid pressure to press the main liner member against the main pipe line and the gasket against the main pipe near the pipe junction.

17. The apparatus of claim 14 wherein the main liner member is formed as a tube.

18. The apparatus of claim 14 wherein the gasket is a single band of impermeable material.

19. The apparatus of claim 14 wherein the hydrophilic material capable of swelling in response to being exposed to a liquid.

20. The apparatus of claim 14 wherein the gasket has a tubular portion with a first end and a second end and a flange portion extending outwardly from one of the first and second ends of the tubular portion.

21. The apparatus of claim 20 wherein the flange portion of the gasket is positioned on the main liner member and surrounds the liner juncture formed between the main liner member and the lateral liner tube.

22. The apparatus of claim 14 wherein the gasket is attached to the main liner member by at least one of stitching, stapling, and an adhesive.

23. A method of repairing a main pipe and a lateral pipe connected thereto and in communication therewith to form a pipe juncture, comprising:
    taking a repair assembly comprising a liner assembly, the liner assembly including a main liner member and a lateral liner tube extending from the main liner member;
    impregnating the liner assembly with a material capable of curing and hardening;
    positioning a gasket formed from an impermeable hydrophilic material on the main liner member at least partially around a liner juncture between the main liner member and the lateral liner tube;
    inverting the lateral liner through the gasket and against the lateral pipe; and allowing the material capable of curing and hardening to cure and harden.

24. The method of claim 23 wherein the step of impregnating the liner assembly with a material capable of curing and hardening is performed before the step of positioning the hydrophilic gasket.

25. The method of claim 23 wherein the main liner member is formed as a tube.

26. The method of claim 23 wherein the hydrophilic material capable of swelling in response to being exposed to a liquid.

27. The method of claim 23 wherein the repair assembly further comprises a bladder assembly including a main bladder tube and a lateral bladder tube extending from the main bladder tube, wherein the main liner member at least partially surrounds the main bladder tube.

28. The method of claim 27 further comprising inflating the bladder assembly to press the main liner member against the main pipe.

29. The method of claim 28 wherein inflating the bladder assembly causes the lateral liner to invert through the gasket and against the lateral pipe.

30. The method of claim 23 further comprising attaching the gasket to the main liner member.

31. The method of claim 30 wherein the gasket is attached to the main liner member by at least one of stitching, stapling, and an adhesive.

32. The method of claim 30 wherein the gasket is attached to the main liner member before the lateral liner is inverted through the gasket.

\* \* \* \* \*